United States Patent
Ono

[11] Patent Number: 5,696,812
[45] Date of Patent: Dec. 9, 1997

[54] DATA COMMUNICATION APPARATUS HAVING A FUNCTION OF RECORDING A VOICE INTO A MEMORY

[75] Inventor: Takashi Ono, Yokosuka, Japan

[73] Assignee: Canon Kabushiki Kaisha, Tokyo, Japan

[21] Appl. No.: 497,982

[22] Filed: Jul. 3, 1995

[30] Foreign Application Priority Data

Jul. 15, 1994 [JP] Japan .................. 6-186543

[51] Int. Cl.⁶ .................. H04M 1/64; H04M 11/08
[52] U.S. Cl. .................. 379/88; 379/100
[58] Field of Search .................. 379/88, 100

[56] References Cited

U.S. PATENT DOCUMENTS

| | | | |
|---|---|---|---|
| 4,932,048 | 6/1990 | Kenmochi et al. | 379/67 |
| 5,347,572 | 9/1994 | Avni | 379/100 |
| 5,425,082 | 6/1995 | Sugino | 379/100 |
| 5,504,806 | 4/1996 | Kawakami | 379/67 |
| 5,506,872 | 4/1996 | Mohler | 375/240 |
| 5,553,220 | 9/1996 | Keene | 395/154 |

*Primary Examiner*—Thomas W. Brown
*Attorney, Agent, or Firm*—Fitzpatrick, Cella, Harper & Scinto

[57] ABSTRACT

In a facsimile apparatus, image data and voice data are stored in a common memory, management information for discriminating whether data stored within the memory is image data or voice data is formed, and storage of the image data and the voice data into the memory and reading of this data from the memory, are controlled in accordance with the management information.

20 Claims, 3 Drawing Sheets

DATA COMMUNICATION APPARATUS HAVING A FUNCTION OF RECORDING A VOICE INTO A MEMORY

BACKGROUND OF THE INVENTION

1. Field of the Invention

This invention relates to a data communication apparatus having a function of recording a voice message into a memory.

2. Background of the Invention

Facsimile apparatuses having the functions of a telephone set which records a voice message during an operator's absence have, for example, been known as apparatuses of this kind. In such facsimile apparatuses, a voice signal is recorded and reproduced using a dedicated LSI (large-scale integrated circuit) for performing digital signal processing of the voice signal (hereinafter, a "voice recording/reproducing IC"), which also controls a memory for storing voice data. However, such an apparatus has a problem in that a control unit (CPU (central processing unit)) of the apparatus cannot determine how the voice memory is controlled. In some apparatuses, the control unit of the apparatus controls the voice memory in order to control storage of voice data (as disclosed, for example, in U.S. Pat. No. 4,932,048, dated Jun. 5, 1990).

In such a facsimile apparatus, however, a memory for image data and a memory for voice data are separately provided. Accordingly, even if there is a remaining capacity in the image memory when the capacity of the voice memory has been fully utilized, the image memory cannot be used as a voice memory. Hence, there is waste of memory capacity from the viewpoint of efficient utilization of the memories.

SUMMARY OF THE INVENTION

The present invention has been made in consideration of the above-described problems.

It is an object of the present invention to improve a conventional data communication apparatus.

It is another object of the present invention to efficiently utilize memory capacity by storing both a voice signal and data in a common memory.

According to one aspect, the present invention, which achieves these objectives, relates to a data communication apparatus having means for inputting a voice message, means for inputting data, a semiconductor memory for storing the voice message and the data, means for storing management information to manage information stored in the semiconductor memory, and control means for generating the management information, for storing the voice message or the data into the semiconductor memory in accordance with the management information, and for reading the voice message or the data from the semiconductor memory based on the management information.

According to another aspect, the present invention relates to a data communication apparatus having means for inputting a voice message, means for inputting data, data reproducing means for reproducing the data, memory means for storing the input voice message and the input data, and control means for storing the input voice message and the input data into the memory means, and for restricting the storage of the voice message into the memory means in accordance with a condition of the data reproducing means.

The foregoing and other objects, advantaged and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described in detail with reference to the drawings.

Figure 1:
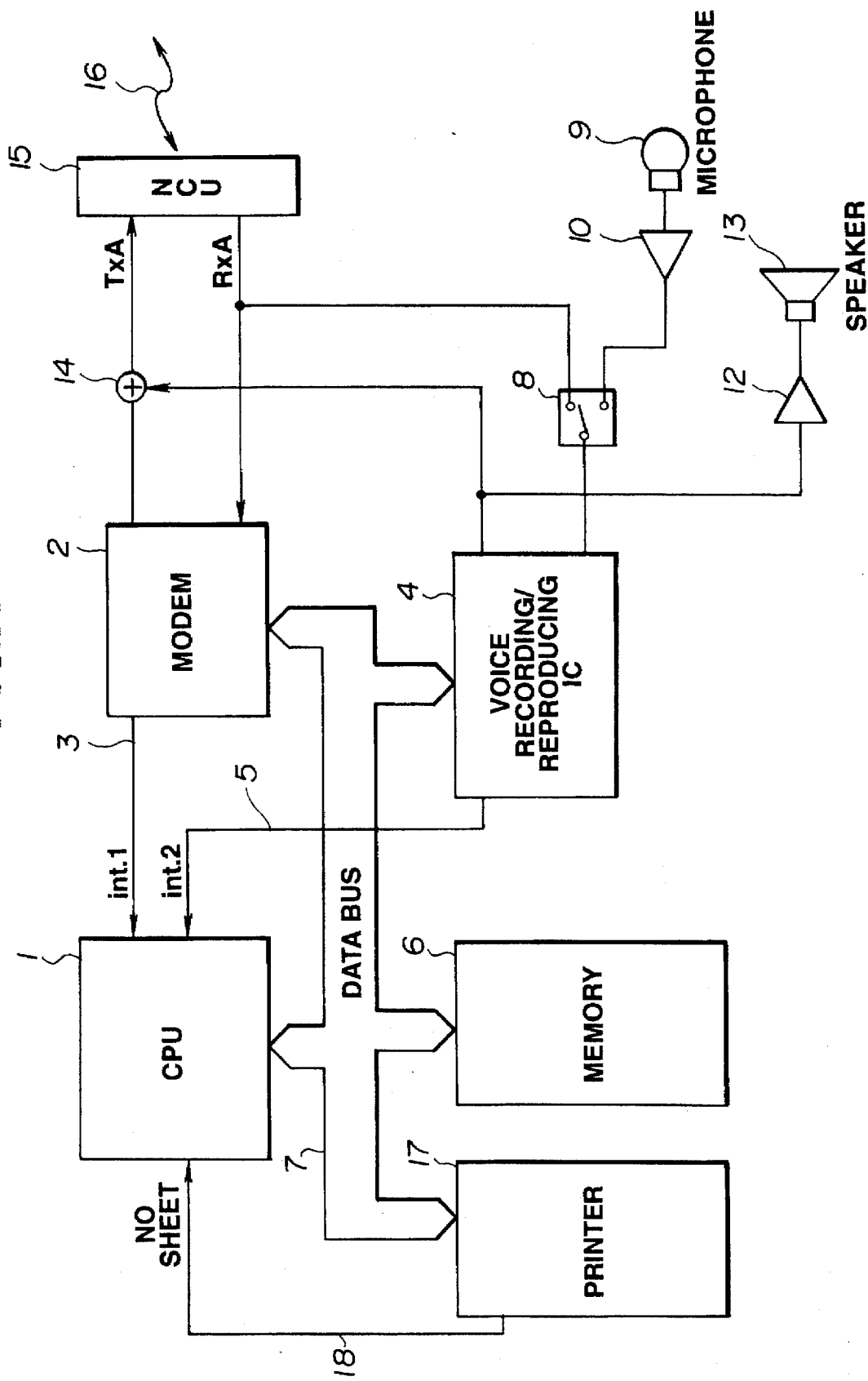
FIG. 1 is a block diagram illustrating the configuration of a facsimile apparatus according to a preferred embodiment of the present invention.

FIG. 1 is a block diagram illustrating the configuration of a communication system of a facsimile apparatus of the preferred embodiment.

This facsimile apparatus includes a CPU 1 for controlling the entire apparatus, a modem 2 for modulating image data to be transmitted and demodulating a received image signal, a voice recording/reproducing IC 4 for performing A/D (analog-to-digital) conversion and D/A (digital-to-analog) conversion of a voice signal, and compression/expansion of data after A/D conversion, a memory (a semiconductor memory, such as a backed-up DRAM (dynamic random access memory) or the like) 6 for storing image data and voice data (voice messages), a data bus 7 for transmitting/receiving image data and voice data, a switch 8 for switching the source of a voice signal to be recorded between a microphone and a telephone line, a microphone 9 for inputting voice, a microphone amplifier 10 for amplifying the output of the microphone 9, a speaker 13 for outputting voice, a speaker amplifier 12 for driving the speaker 13, an addition circuit 14 for adding the transmission output of the modem 2 and the transmission output of the voice recording/reproducing IC 4, an NCU (network control unit) 15 for controlling connection to a telephone line 16, and the like, and a printer 17.

An interrupt signal 3 (hereinafter termed an "int.1"), input from the modem 2 to the CPU 1, is a data request signal indicating a request of data writing when transmitting an image, and a request of data read when receiving an image. An interrupt signal 5 (hereinafter termed an "int.2"), input from the voice recording/reproducing IC 4 to the CPU 1, is a data request signal requesting reading of voice data when recording a voice, and writing of voice data when reproducing a voice.

Figure 2:
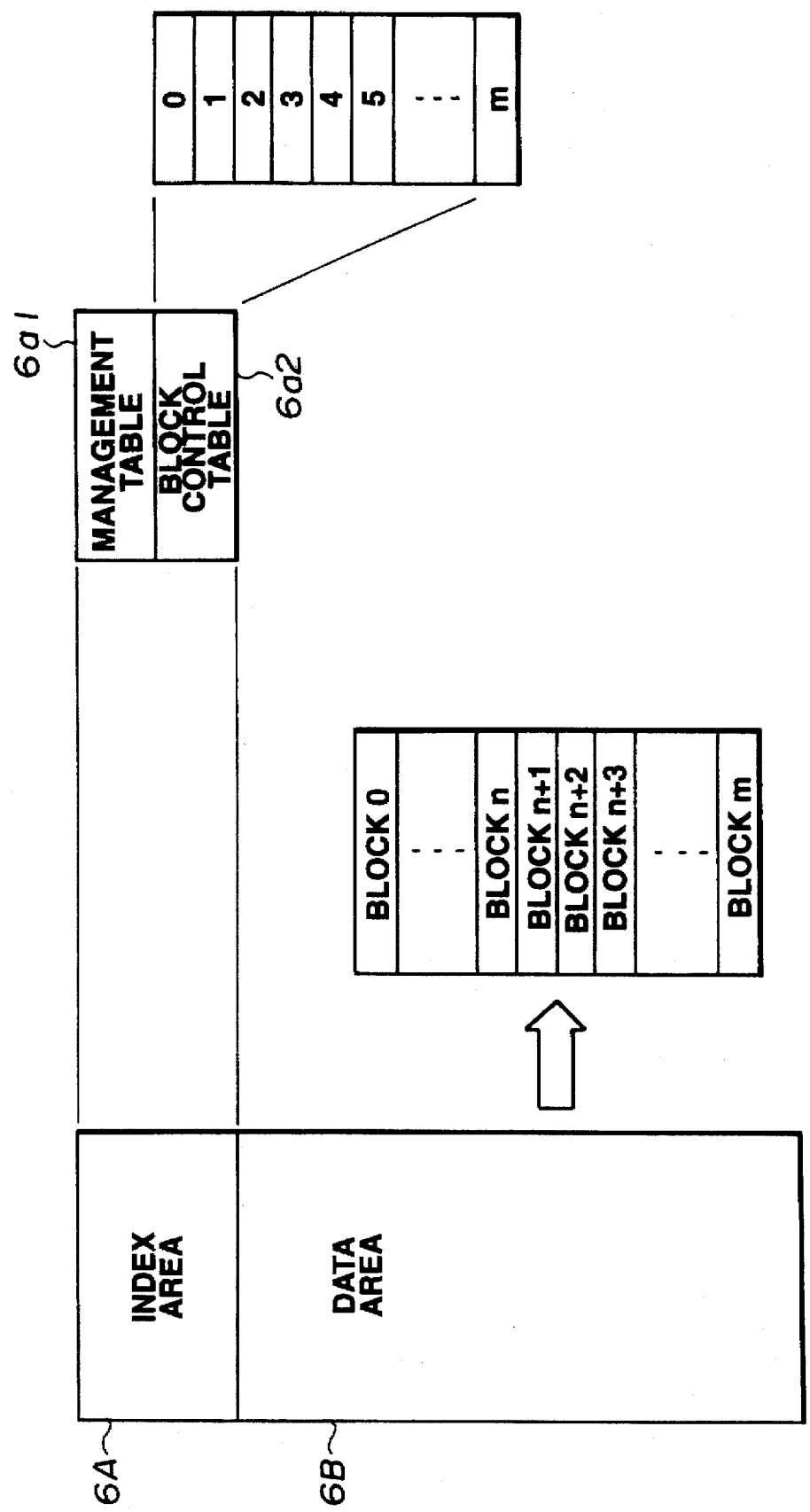
FIG. 2 is a diagram illustrating memory areas.

FIG. 2 is a diagram illustrating the configuration of the memory 6 for storing image data and voice data.

As shown in FIG. 2, the memory 6 is divided into an index area 6A and a data area 6B.

The data area 6B is finely divided into a plurality of blocks, each block having a predetermined byte length. The index area 6A is further divided into a management table 6a1 and a block control table 6a2. The number of the first block in which image data or voice data is stored is stored in the management table 6a1. The block control table 6a2 provides areas whose number equals the number of the blocks obtained by dividing the data area. When each block is vacant or includes data, information indicating the number of the next block where the succeeding portion of the data is present, or end of data is stored.

When storing data in the data area 6B, the CPU 1 stores data in a vacant block by referring to the block control table 6a2. When the entire data cannot be stored in that block, another vacant block is searched for, the remaining portion of the data is stored therein, and the number of the block where the remaining portion of the data is present is stored in the area of the block control table 6a2 corresponding to that block. When the data is completed in that block, information indicating the end of the data is stored in the area of the block control table 6a2 corresponding to that block.

When reading data, data is sequentially read from a start block stored in the management table 6a1, such that then, data stored in the block having the block number stored in a start block area of the block control table 6a2 is read, and finally data stored in a block for which information indicating the end of the data is written in the block control table 6a2 is read.

Next, a description will be provided of the operation of a data communication apparatus having the configuration described above.

When recording a voice message from the microphone 9, recording is started by switching the switch 8 to the microphone side. A voice signal is subjected to A/D conversion, and then to data compression, by the voice recording/ reproducing IC 4.

When data for one byte has been obtained, the voice recording/reproducing IC 4 outputs an int.2 to request the CPU 1 to read the data. The CPU 1 searches for a vacant block starting from block 0 of the block control table 6a2. When a vacant block has been found, that block is made a leading block, and the number of the block is stored in the management table 6a1. When there is a data request from the voice recording/reproducing IC 4, data is read from the voice recording/reproducing IC 4 via the data bus 7, and the read data is stored in the leading block.

When there remains no vacant space in the leading block, the CPU 1 again searches the block control table in order to store data in a vacant block, and stores the number of a new block in the preceding block area in the block control table 6a2. When there is no longer any data to be stored in that block, information indicating the end of the data is written in the area of that block in the block control table 6a2.

When reproducing a recorded voice message, the CPU 1 reads the number of a start block, including the message to be reproduced, from the management table 6a1, and sequentially writes data starting from the start block, in the voice recording/reproducing IC 4, via the data bus 7. The voice recording/reproducing IC 4 generates an analog signal from the written data and outputs the generated signal. The output analog signal is amplified by the speaker amplifier 12, and is reproduced by the speaker 13 or is output to the telephone line 16 via the NCU 15.

When erasing a recorded message, information indicating that the block used for recording the message is vacant is written in the area of that block of the block control table 6a2.

Similar processing may be performed for image data. For example, when storing image data, received during an absence of recording paper, in the memory 6, the CPU 1 searches the block control table 6a2, makes a vacant block a start block, and stores the number of the vacant block in the management table 6a1. The modem 2 demodulates the received image signal, and outputs a data request signal int.1 when data for one byte has been obtained.

Upon reception of a data request signal from the modem 2, the CPU 1 reads data and sequentially stores the read data from the start block stored in the management table 6a1.

As described above, by providing the above-described configuration of the memory 6, by outputting compressed voice data to the data bus T, and by using the voice recording/reproducing IC 4 for recording/reproducing a voice signal by converting the voice data input from the data bus 7 into an analog signal by expanding the data, both image data and voice data can be stored in the same memory 6, so that an efficient utilization of the memory can be realized.

When an exhaustion of recording paper has been detected according to a signal 18, indicating the absence of paper, from means for detecting the presence/absence of recording paper (not shown) provided in the printer 17, the CPU 1 restricts the number of blocks capable of being used for storing voice data to a predetermined number so that voice data cannot be stored in the blocks whose numbers exceed the restricted number. Even if the amount of voice data exceeds the predetermined amount when the recording paper is exhausted, or when the printer 17 cannot perform recording, the remaining blocks are secured for image data. When the recording paper has been replenished thereafter, the restriction on the amount of voice data which can be stored is released.

Figure 3:
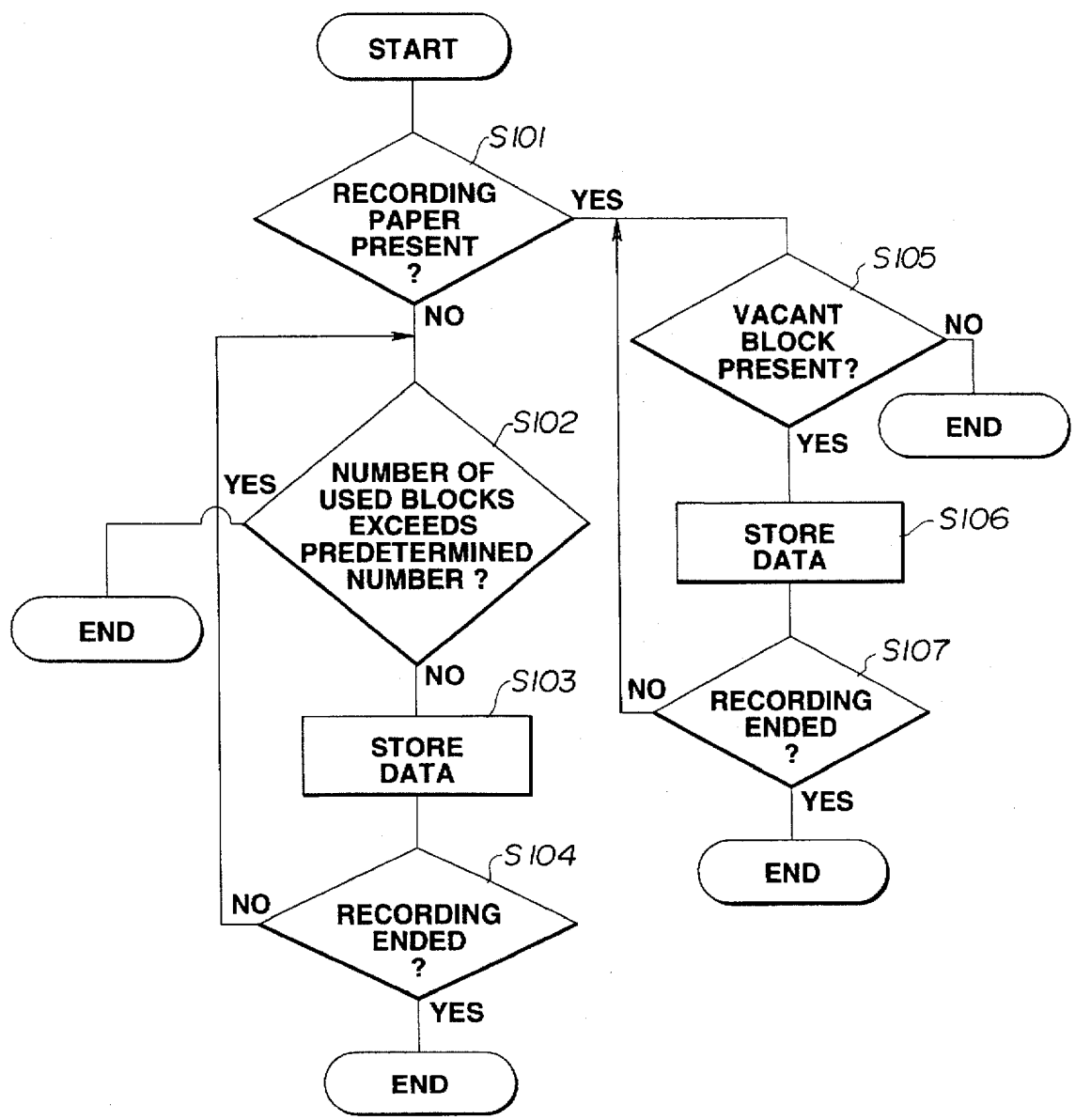
FIG. 3 is a flowchart illustrating a control operation when recording a voice signal in the preferred embodiment.

FIG. 3 is a flowchart illustrating the operation of a data communication apparatus when recording a voice message.

When a voice recording mode has been provided, the CPU 1 determines in step S101 if recording paper is present. If the result of the determination is negative, the process proceeds to step S102, where it is determined if the number of blocks used for storing voice data exceeds a predetermined mount. If the result of the determination in step S102 is affirmative, the recording mode is stopped.

If the result of the determination in step S102 is negative, the process proceeds to step S103, where voice data is stored in vacant blocks. The process then proceeds to step S104, where voice data is recorded until the recording is completed or until the number of blocks used for recording the voice data exceeds the predetermined amount.

If the result of the determination in step S101 is affirmative, the process proceeds to step S105, where it is determined if there is a vacant block. If the result of the determination is negative, the recording of the voice data is stopped. If the result of the determination in step S105 is affirmative, the process proceeds to step S106, where voice data is stored in the vacant block. The process then proceeds to step S107, where the recording of the voice data continues until the recording has been completed or until there remains no vacant blocks.

If an absence mode is set when the remaining amount of the memory 6 is less than a predetermined amount, a warning sound is generated from the speaker 13. It is thereby possible to warn the operator that the remaining amount of the memory 6 is small, if the absence mode is set when a large portion of the memory 6 is used, for example, in order to transmit the same information a plurality of times.

The remaining amount of the memory 6 is detected by checking the vacant blocks and the used blocks by referring to the block control table 6a2.

Although in the above-described embodiment, the modem 2 and the voice recording/reproducing IC 4 are provided by different IC's, the same effects may also be obtained even if the modem 2 includes the function of the voice recording/ reproducing IC 4.

The method for controlling the memory 6 is not limited to the above-described method. That is, addresses of the memory 6 may be directly controlled, instead of controlling the memory 6 in units of a block, provided that voice data and image data can be stored in the same memory.

In order to secure the minimum limit for areas for storing voice data, the upper limit of the number of blocks capable of being used for storing image data may be determined. In this case, the number of blocks may be programmably changed in accordance with the frequency of usage.

As described above, according to the present embodiment, by arranging the apparatus such that voice data and image data can be stored in the same memory, it is possible to efficiently utilize the memory and therefore to reduce the size of the substrate of the memory, as well as to reduce the cost of the apparatus.

Image data is stored in the memory in most cases only when storing received information in the memory because recording paper has exhausted. Accordingly, by restricting the number of blocks used for storing voice data when recording paper is exhausted, areas capable of storing image data can be secured.

The individual components shown in outline or designated by blocks in the drawings are all well known in the data communication apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data communication apparatus comprising:
   means for inputting a voice message;
   means for inputting data;
   a semiconductor memory for storing a digital representation of the voice message and the data;
   means for storing management information to manage information stored in said semiconductor memory, said management information storing means comprising a management table and a block control table, the management table storing a starting block of the block control table and the block control table storing a next position or an end position of the information stored in said semiconductor memory; and
   control means for generating the management information, for storing the digital representation of the voice message or the data into said semiconductor memory in accordance with the management information, and for reading the digital representation of the voice message or the data from said semiconductor memory based on the management information.

2. A data communication apparatus comprising;
   means for inputting a voice message;
   means for inputting data;
   a semiconductor memory for storing a digital representation of the voice message and the data;
   means for storing management information to manage information stored in said semiconductor memory;
   control means for generating the management information, for storing the digital representation of the voice message or the data into said semiconductor memory in accordance with the management information, and for reading the digital representation of the voice message or the data from said semiconductor memory based on the management information; and
   data reproducing means for reproducing the data, wherein said control means stores the digital representation of the voice message into said semiconductor memory in accordance with a condition of said data reproducing means.

3. A data communication apparatus according to claim 2, wherein when said data reproducing means is incapable of reproducing the data, said control means restricts the storage of the digital representation of the voice message into said semiconductor memory.

4. A data communication apparatus comprising;
   means for inputting a voice message;
   means for inputting data;
   a semiconductor memory for storing a digital representation of the voice message and the data;
   means for storing management information to manage information stored in said semiconductor memory;
   control means for generating the management information, for storing the digital representation of the voice message or the data into said semiconductor memory in accordance with the management information, and for reading the digital representation of the voice message or the data from said semiconductor memory based on the management information; and
   means for selecting an absence mode of storing the digital representation of the voice message into said semiconductor memory, and means for generating an alarm in accordance with an available memory amount of said semiconductor memory when the absence mode has been selected by said selecting means.

5. A data communication apparatus comprising;
   means for inputting a voice message;
   means for inputting data;
   a semiconductor memory for storing a digital representation of the voice message and the data;
   means for storing management information to manage information stored in said semiconductor memory, said management information storing means comprising a management table and a block control table, the management table storing a starting block of the block control table and the block control table storing a next position or an end position the information stored in said semiconductor memory; and
   control means for generating the management information, for storing the digital representation of the voice message or the data into said semiconductor memory in accordance with the management information, and for reading the digital representation of the voice message or the data from said semiconductor memory based on the management information, wherein the data comprises image data.

6. A data communication apparatus comprising;
   means for inputting a voice message;
   means for inputting data;
   a semiconductor memory for storing a digital representation of the voice message and the data;
   means for storing management information to manage information stored in said semiconductor memory, said management information storing means comprising a management table and a block control table, the management table storing a starting block of the block control table and the block control table storing a next position or an end position of the information stored in said semiconductor memory; and control means for generating the management information, for storing the digital representation of the voice message or the data into said semiconductor memory in accordance with the management information, and for reading the digital representation of the voice message or the data from said semiconductor memory based on the management information; and voice reproducing means for reproducing the voice message.

7. A data communication apparatus comprising:

means for inputting a voice message;

means for inputting data;

data reproducing means for reproducing the data;

memory means for storing a digital representation of the input voice message and the input data; and control means for storing the digital representation of the input voice message and the input data into said memory means, and for restricting the storage of the digital representation of the voice message into said memory means in accordance with a condition of said data reproducing means.

8. A data communication apparatus according to claim 7, wherein when said data reproducing means is incapable of reproducing the data, said control means restricts the storage of the digital representation of the voice message.

9. A data communication apparatus according to claim 7, further comprising means for selecting an absence mode of storing the digital representation of the voice message into said memory means, and means for generating an alarm in accordance with an available memory amount of said memory means when the absence mode has been selected by said selecting means.

10. A data communication apparatus according to claim 7, wherein said control means generates management information to manage information stored in said memory means, stores the digital representation of the voice message or the data in accordance with the management information, and reads the digital representation of the voice message or the data from said memory means in accordance with the management information.

11. A data communication method comprising the steps of:

inputting a voice message;

inputting data;

generating management information to manage information to be stored in a semiconductor memory;

storing the management information in a memory, the management information memory comprising a management table and a block control table, the management table storing a starting block of the block control table and the block control table storing a next position or an end position of the information to be stored in the semiconductor memory;

storing a digital representation of the voice message or the data into the semiconductor memory in accordance with the management information; and reading the digital representation of the voice message or the data from the semiconductor memory based on the management information.

12. A data communication method for a data communication apparatus having data reproducing means for reproducing data, comprising the steps of:

inputting a voice message;

inputting data;

generating management information to manage information to be stored in a semiconductor memory;

storing the management information in a memory;

storing a digital representation of the voice message or the data in the semiconductor memory in accordance with the management information;

reading the digital representation of the voice message or the data from the semiconductor memory based on the management information; and reproducing the data with the data reproducing means, wherein the digital representation of the voice message is stored into the semiconductor memory in accordance with a condition of the data reproducing means.

13. A data communication method according to claim 12 wherein when the data reproducing means is incapable of reproducing the data, the storage of the digital representation of the voice message into the semiconductor memory is restricted.

14. A data communication method comprising the steps of:

inputting a voice message;

inputting data;

generating management information to manage information to be stored in a semiconductor memory;

storing the management information in a memory;

storing a digital representation of the voice message or the data in the semiconductor memory in accordance with the management information;

reading the digital representation of the voice message or the data from the semiconductor memory based on the management information;

selecting an absence mode of storing the digital representation of the voice message into the semiconductor memory; and generating an alarm in accordance with an available memory amount of the semiconductor memory when the absence mode has been selected in said selecting step.

15. A data communication method comprising the steps of:

inputting a voice message;

inputting data;

generating management information to manage information to be stored in a semiconductor memory;

storing the management information in a memory, the management information memory comprising a management table and a block control table, the management table storing a starting block of the block control table and the block control table storing a next position or an end position of the information to be stored in the semiconductor memory;

storing a digital representation of the voice message or the data in the semiconductor memory in accordance with the management information; and reading the digital representation of the voice message or the data from the semiconductor memory based on the management information;

wherein the data comprises image data.

16. A data communication method comprising the steps of:

inputting a voice message;

inputting data;

generating management information to manage information to be stored in a semiconductor memory;

storing the management information in a memory, the management information memory comprising a management table and a block control table, the management table storing a starting block of the block control table and the block control table storing a next position or an end position of the information to be stored in the semiconductor memory;

storing a digital representation of the voice message or the data in the semiconductor memory in accordance with the management information; and reading the digital representation of the voice message or the data from the semiconductor memory based on the management information; and reproducing the voice message.

17. A data communication method for a data communication apparatus having data reproducing means for reproducing data, comprising the steps of;

inputting a voice message;

inputting data;

reproducing the data with the data reproducing means;

storing in a memory a digital representation of the input voice message and the input data;

restricting said storing of the digital representation of the voice message into the memory in accordance with a condition of the data reproducing means.

18. A data communication method according to claim 17, wherein said restricting step restricts said storing of the digital representation of the voice message when the data reproducing means is incapable of reproducing the data.

19. A data communication method according to claim 17, further comprising the steps of selecting an absence mode of storing the digital representation of the voice message into the memory, and generating an alarm in accordance with an available memory amount of the memory when the absence mode has been selected in said selecting step.

20. A data communication method according to claim 17, further comprising the steps of generating management information to manage information stored in the memory, where said storing step stores the digital representation of the voice message or the data in accordance with the management information, and reading the digital representation of the voice message or the data from the memory in accordance with the management information.

* * * * *

UNITED STATES PATENT AND TRADEMARK OFFICE
CERTIFICATE OF CORRECTION

PATENT NO.  : 5,696,812

DATED       : December 9, 1997

INVENTOR(S) : TAKASHI ONO

It is certified that error appears in the above-identified patent and that said Letters Patent is hereby corrected as shown below:

COLUMN 1

Line 66, "advantaged" should read --advantages--.

COLUMN 4

Line 48, "blocks." should read --block.--.

COLUMN 5

Line 58, "comprising;" should read --comprising:--.

COLUMN 6

Line 17, "comprising;" should read --comprising:--.

Line 39, "comprising;" should read --comprising:--.

Line 50, "position" (2nd occurrence) should read --position of--

Line 60, "comprising;" should read --comprising:--

COLUMN 8

Line 20, "claim 12" should read --claim 12,--.

UNITED STATES PATENT AND TRADEMARK OFFICE
CERTIFICATE OF CORRECTION

PATENT NO. : 5,696,812

DATED : December 9, 1997

INVENTOR(S) : TAKASHI ONO

It is certified that error appears in the above-identified patent and that said Letters Patent is hereby corrected as shown below:

COLUMN 9

Line 24, "of;" should read --of:--.

Signed and Sealed this

Sixteenth Day of June, 1998

Attest:

BRUCE LEHMAN

Attesting Officer

Commissioner of Patents and Trademarks